(12) United States Patent
Heiskanen et al.

(10) Patent No.: US 10,577,805 B2
(45) Date of Patent: Mar. 3, 2020

(54) METHOD FOR APPLYING A WALLPAPER MATERIAL

(71) Applicant: Stora Enso OYJ, Helsinki (FI)

(72) Inventors: Isto Heiskanen, Imatra (FI); Duncan Mayes, Helsinki (FI); Simo Siitonen, Rautjärvi (FI)

(73) Assignee: Stora Enso OYJ, Helsinki (FI)

( * ) Notice: Subject to any disclaimer, the term of this patent is extended or adjusted under 35 U.S.C. 154(b) by 134 days.

(21) Appl. No.: 15/537,039

(22) PCT Filed: Dec. 14, 2015

(86) PCT No.: PCT/IB2015/059590
§ 371 (c)(1),
(2) Date: Jun. 16, 2017

(87) PCT Pub. No.: WO2016/097973
PCT Pub. Date: Jun. 23, 2016

(65) Prior Publication Data
US 2017/0350135 A1    Dec. 7, 2017

(30) Foreign Application Priority Data
Dec. 19, 2014   (SE) ...................................... 1451602

(51) Int. Cl.
*E04F 13/02* (2006.01)
*C09D 101/02* (2006.01)
(Continued)

(52) U.S. Cl.
CPC ................ *E04F 13/02* (2013.01); *B05D 1/02* (2013.01); *C04B 26/28* (2013.01); *C09D 101/02* (2013.01);
(Continued)

(58) Field of Classification Search
None
See application file for complete search history.

(56) References Cited

U.S. PATENT DOCUMENTS

2012/0088874 A1    4/2012  Bonin et al.
2015/0114581 A1*   4/2015  Kinnunen ............. D21H 11/18
                                                   162/125

FOREIGN PATENT DOCUMENTS

DE        3604948 A    8/1987
DE        3606167 A1   8/1987
(Continued)

OTHER PUBLICATIONS

International Search Report for PCT/IB2015/059590, dated Apr. 1, 2016.

*Primary Examiner* — Shamim Ahmed
*Assistant Examiner* — Bradford M Gates
(74) *Attorney, Agent, or Firm* — Greer, Burns & Crain Ltd.

(57) ABSTRACT

The present invention relates to a method for applying a wallpaper material onto a surface comprising the steps of providing a liquid suspension comprising cellulosic fibers wherein at least part of said cellulosic fibers comprises microfibrillated cellulose and wherein said liquid suspension has a dry content of at least 10% by weight, applying at least one layer of said liquid suspension onto the surface, drying said liquid suspension layer after it has been applied onto the surface, and thereby forming a dry fiber web layer, wherein said fiber web layer forms said wallpaper material.

7 Claims, 1 Drawing Sheet

(51) Int. Cl.
*D21H 11/18* (2006.01)
*C04B 26/28* (2006.01)
*D21H 27/20* (2006.01)
*C09D 197/02* (2006.01)
*B05D 1/02* (2006.01)
*D21H 27/18* (2006.01)

(52) U.S. Cl.
CPC ............ *C09D 197/02* (2013.01); *D21H 11/18* (2013.01); *D21H 27/18* (2013.01); *D21H 27/20* (2013.01); *Y02W 30/97* (2015.05)

(56) References Cited

FOREIGN PATENT DOCUMENTS

| | | |
|---|---|---|
| DE | 4317957 A1 | 12/1994 |
| DE | 29613699 U1 | 10/1996 |
| EP | 0792923 A1 | 9/1997 |
| JP | 2008201997 A | 9/2008 |
| WO | 2011059398 A1 | 5/2011 |
| WO | 2013156223 A1 | 10/2013 |

\* cited by examiner

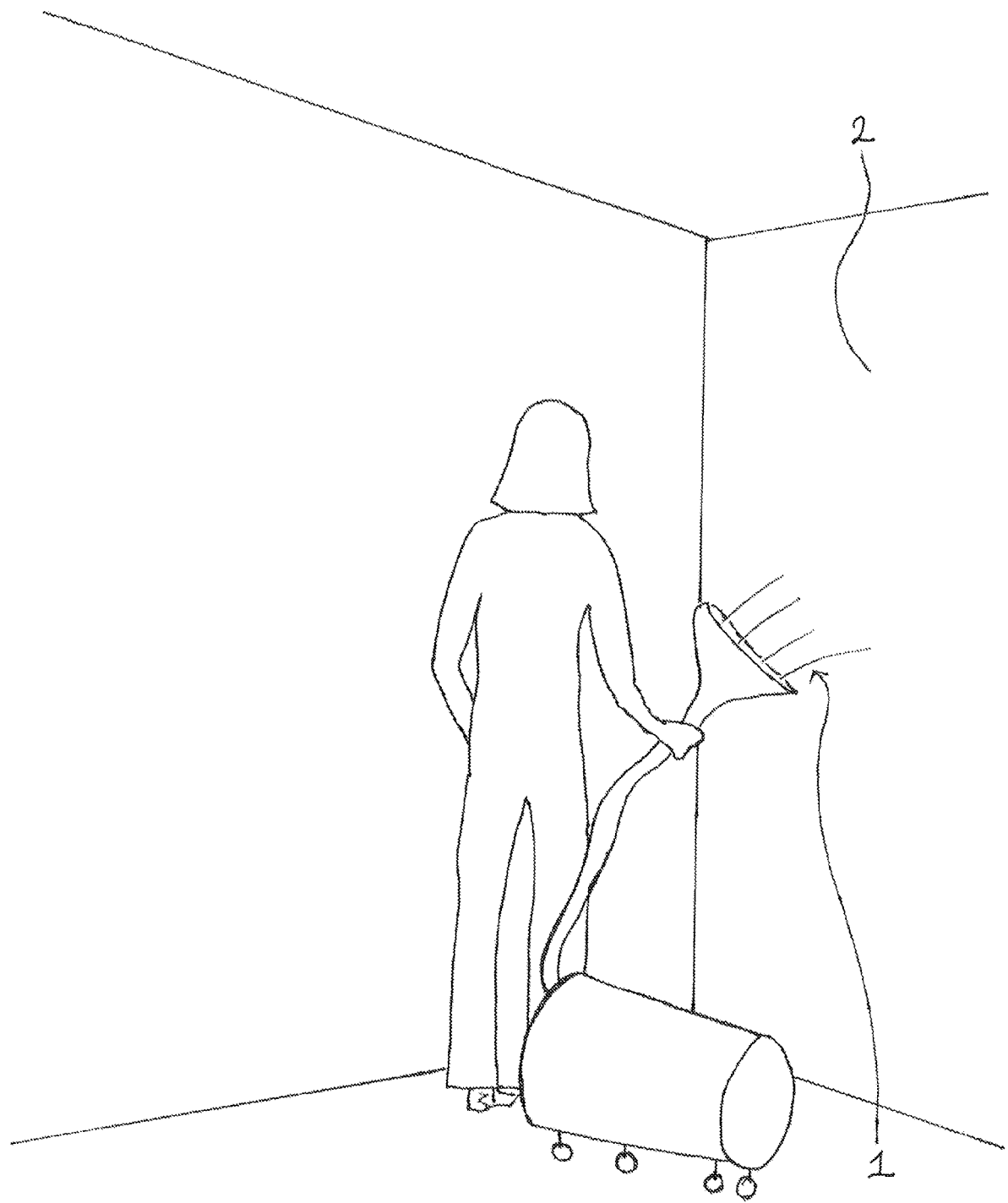

METHOD FOR APPLYING A WALLPAPER MATERIAL

This application is a U.S. National Stage under 35 U.S.C. § 371 of International Application No. PCT/IB2015/059590, filed Dec. 14, 2015, which claims priority to Swedish Patent Application No. 1451602-5, filed Dec. 19, 2014.

TECHNICAL FIELD

The present invention relates to a method for applying a liquid suspension comprising cellulosic fibers onto a surface thereby forming a wallpaper.

BACKGROUND

Currently, wallpapers are sold in rolls and fixated onto a wall by the use of an adhesive. The wallpaper may be ready-made with an adhesive on the backside which is activated by applying water onto the wallpaper, or the adhesive, a glue or paste may be applied to the back of the wallpaper just prior to hanging the wallpaper length on the wall. One wallpaper length must then be fitted together with another length. It thus takes both paste or glue, and considerable amount of adjustments to hang a wallpaper onto a wall. This work is not that easy, i.e. it often takes a skilled person such as a painter to perform. Also, once the wallpaper is attached onto the wall it will be very difficult to mend any damages in the wallpaper surface.

There is thus a need for a new way of covering a surface for decorative and protective purposes.

SUMMARY

It is an object of the present invention, to provide an improved or alternative wallpaper material, which eliminates or alleviates at least some of the disadvantages of the prior art wallpapers.

More specifically the present invention includes providing a method for applying the inventive wallpaper material onto a surface.

The invention is defined by the appended independent claims. Embodiments are set forth in the appended dependent claims and in the following description and drawings.

According to a first aspect, there is provided a wallpaper material comprising a cellulosic fiber wherein the wallpaper material is formed when a liquid suspension comprising said cellulosic fiber has been applied onto a surface and subsequently dried thereon. This means that the wallpaper is provided as a liquid suspension which is applied onto a surface and when dried forms a layer of a fiber web thereby forming said wallpaper material.

It has surprisingly been found that it is possible to apply, preferably by spraying, a suspension comprising cellulosic fibers directly to a surface and the suspension will then adhere and then also dry at the surface, thus forming a fiber web in the form of a wallpaper on the surface, i.e. it was found possible to produce a sprayable wallpaper comprising cellulosic fibers. Thus, there is no need for glue or hanging of wallpaper in the form of paper lengths from wallpaper rolls. A further advantage is that since there are no edges as with normal wallpaper lengths, the risk for the edges to show after a while, due to movement of the wall or shrinkage of the wallpaper, is strongly reduced. Also, in case there is a damage in the wallpaper, such as through a scratch, a nail or screw hole, or miscoloring, the wallpaper can easily be repaired by simply applying a new or additional layer of the liquid suspension to the damaged area.

By applied onto a surface, it is meant that the suspension is brought onto a surface which is intended to be covered with a wallpaper.

By "surface" it is meant any kind of surface, such as a wall or a ceiling. The surface may be made from a wide range of materials, such as wood, concrete or plasterboard. The surface may have any kind of structure, i.e. an even or uneven surface structure. It may further be applied to both indoor and outdoor surfaces.

By "dried" it is meant that the suspension, when applied to the wall is either allowed to dry up on its own or is actively dried with e.g. heat or air in order to form the dry fiber web.

By "layer" it is meant that a film or a coating is substantially formed onto the surface. The film may be continuos or non-continuos. This film adheres to the surface through a hydro-colloidal effect, i.e. a crosslinking effect making the cellulosic fibers stick together and thus a film is formed on the surface.

According to one embodiment the cellulosic fiber content of the suspension is at least partially microfibrillated cellulose. By at least partially it is meant that the suspension may be a mixture between microfibrillated cellulose and other types of fiber, e.g. longer cellulosic fibers. The suspension may also comprise other types of fibers not being cellulosic. There is a high need to be able to spread the fibers evenly as a coating to form the wallpaper on the surface. It has surprisingly been found that if the cellulosic fibers are fine enough, with regards to size and dimensions, fiber flocculation into visually fibre-bundles and flocks may be prevented, which otherwise usually occurs due to the very high flocculation tendency of the fibers, especially fibers in a water solution. When fibers have small enough dimensions, such as the MFC fibers, the water-fibers mixture forms a uniform system, where the fibers are evenly distributed and where no water separation occurs. Furthermore, it has also been found that by adding longer fibers, this very fine fiber fraction, i.e. MFC, also may prevent flocculation of these longer fibers, and an even mixture can be produced.

According to another embodiment the suspension may further comprise any one of a pigment, a filler, an additive or a combination thereof.

By mixing the cellulosic fibers, e.g. MFC, with pigments, fillers and/or other additives, and forming a suspension of said mixture, it is possible to easily form a wall paper having additional properties depending on the filler and/or additive used. It has been found that the very fine fiber as MFC, works as a dispersant also for other additives, such as pigments, pigment colours, dye colours, CMC, etc. Also, it is possible to precipitate the filler to the surface of the cellulosic fibers, e.g. MFC.

According to another embodiment the MFC fibers may be colored by pigments previous to addition of the MFC to the suspension, thus providing the suspension with different colors. It has been found that the MFC can be colored with pigments without reducing the adhesion properties that the MFC also provides the wallpaper with different appearances.

The liquid suspension may comprise at least 40% by weight of fibers, or at least 50% by weight of fibers and may have a solids content of above 10% by weight.

According to a second aspect there is provided a method for applying a wallpaper material onto a surface comprising the steps of: providing a liquid suspension comprising cellulosic fibers; applying at least one layer of said liquid suspension onto the surface; drying said liquid suspension layer after it has been applied onto the wall, thereby forming a dry fiber web layer, wherein said fiber web layer forms said wallpaper material.

By this method there is provided a very simple way of applying a wallpaper onto a surface without the use of glue, paste or other adhesives and without the need to fit wallpaper lengths together. The liquid suspension is applied onto the surface and there it forms a layer which when dry forms a fiber web and the actual wallpaper.

According to one embodiment of the second aspect the cellulosic fiber content of said suspension may at least partially comprise microfibrillated cellulose.

According to another embodiment the suspension may further comprise any one of a pigment, a filler and an additive, or a combination thereof.

According to yet another embodiment the liquid suspension may comprise at least 40% by weight of fibers, or at least 50% of weight.

According to an alternative embodiment the liquid suspension may have a dry content of at least 10% by weight.

The dry content of the liquid suspension applied is important, too low dry content makes it difficult for the fibers to stick to the wall and also the time for the wallpaper to dry is too long. Too high consistency will make it difficult to apply the mixture through spraying.

According to one embodiment of the second aspect the step of applying said liquid suspension onto said surface may be performed by means of spraying.

By means of spraying it is meant that that some sort of spraying device is used when applying the suspension onto the wall. The spraying device may comprise a nozzle having different shapes and dimensions to achieve the desired layers with regards to appearance and thickness. The spraying device may also be some sort of robot device for a fully automated application of the suspension. Such a robotic spray device may also include multiple spray nozzles making it possible to create for example a multicolored and textured effect.

According to one embodiment the second aspect may further comprise the step of applying two or more layers of the liquid suspension onto the wall.

According to one embodiment the layer or layers may have a predetermined thickness.

By predetermined thickness is meant that the thickness of the layer which is applied onto the wall may be varied depending on the desired appearance of the wallpaper. It is further also possible to create different contours, such as 3D effects by using different spraying techniques.

According to a third aspect there is provided a wallpaper material obtained by the second aspect of the invention.

According to a fourth aspect there is provided the use of a liquid suspension comprising cellulosic fibers for application onto a surface thereby forming a wallpaper material.

BRIEF DESCRIPTION OF THE DRAWINGS

Embodiments of the present solution will now be described, by way of example, with reference to the accompanying schematic drawings in which:

FIG. 1 is a schematic view of a person applying a wallpaper onto a wall.

DETAILED DESCRIPTION

FIG. 1 illustrates a person applying, by spraying, a liquid suspension 1 comprising cellulosic fibers onto a surface 2 to form a decorative or protective covering of the surface, i.e. a wallpaper.

In one embodiment the suspension 1 comprises cellulosic fibers. The cellulosic fibers may be of different origin and length. According to one alternative, the fiber content of the suspension may be microfibrillated cellulose, hereinafter called MFC. According to another embodiment the fiber content may also be a mixture of different types of cellulosic fibers, for instance one portion may be MFC and a second portion may be longer fibers or fibrils, to achieve a texture and/or effect that is desired. According to yet an alternative the cellulosic fiber content is primarily or solely longer fibers, i.e. longer as compared to MFC.

The microfibrillated cellulose (MFC) is also known as nanocellulose. It is a material typically made from wood cellulose fibers, both from hardwood or softwood fibers. It can also be made from microbial sources, e.g. seaweed fermented fibers, agricultural fibers such as wheat straw pulp, bamboo or other non-wood fiber sources. In microfibrillated cellulose the individual microfibrils have been partly or totally detached from each other. A microfibrillated cellulose fibril is normally very thin (e.g. a width of 5-200 nm) and the length is often between 100 nm to 10 µm. However, the microfibrils may also be longer, for example between 10-200 µm, even lengths of 2000 µm can be found due to wide length distribution. Fibers that have been fibrillated and which have microfibrils on the surface and microfibrils that are separated and located in a water phase of a slurry are included in the definition of MFC.

In order to provide a uniform coating on the surface to form the wallpaper material it is necessary to evenly spread out the cellulosic fibers acting as the coating. This may be difficult when a suspension or solution comprising water and fibers is applied, because of the very high flocculation tendency of the fibers of the suspension which may lead to that the fibers of the suspension not are evenly distributed in the suspension By using cellulosic fibers which are fine enough with regard to size and dimensions, such as MFC, fiber flocculation into visually irritating bundles/flocks is prevented. When fibers have a small enough dimension, water fibers mixture forms a system with substantially evenly distributed fibers, and where no water separation occurs. According to one embodiment the fiber content of the liquid suspension may be at least 40% by weight or at least 50% by weight or even higher. It may be possible that the liquid suspension comprises 100% by weight of fibers of the total solids. The fiber content of the liquid suspension depends amongst other things on the desired thickness and appearance of the resulting wallpaper.

According to one embodiment the liquid suspension may have a total solid content in the range of 10 to 50% by weight, preferably between 20-50% by weight, more preferably between 20-40% by weight. According to an alternative the solid content of the suspension is preferably above 20% by weight. A solid content of about 20% may be optimal for applying the suspension onto the wall by spraying techniques, i.e. by means of spraying.

The solid or dry content of the liquid suspension, or MFC mixture, to be sprayed is very important, since a too low dry/solid content makes it difficult for the fibers to stick to the wall and also the time for the wallpaper to dry will be too long. Too high consistency, i.e. a too high solid content will make it difficult to spray the mixture or suspension and it might also be difficult to achieve an even distribution of the fibers if the solid content is too high.

The MFC provides the wallpaper with improved strength properties compared to conventional wallpaper materials (i.e. paper on rolls) since the MFC improves the fiber bonding which thus will increase the strength of the produced wallpaper. Also, when higher solids contents are used the MFC will contribute to better scratch resistance without the need to significantly increase the amount of traditional inorganic fillers such a calcium carbonate and the likes.

According to one embodiment the suspension may also comprise fillers and/or pigments, such as calcium carbonate, starch, bentonite, titanium dioxide (Tio2), kaolin, aluminium trihydroxide (ATH) or talc.

According to an alternative embodiment, bulky additives can also be added to the suspension or mixture in order to provide the layer with increased bulk. Example of such additives may be expanding microspheres.

Also, additives that improve the texture of the surface may be added. An example of such additive is longer cellulosic fibers.

Additives that will improve the film forming properties of the applied suspension may be added. Examples of such additives are carboxymethyl cellulose (CMC) or polyvinyl alcohol (PVA) which will improve the film forming properties, e.g. the surface strength, adhesion, and improved coverage of the surface.

According to one alternative the additives may be additives having hydrophobic properties facilitating cleaning of the dry surfaces, e.g. hydrophobic chemicals e.g. waxes and AKD and dry and wet strength chemicals.

According to another embodiment, chemicals which may increase the flexibility of the wallpaper surface, such as different type of sugars, latexes, etc. may be added.

The additive may also be, according to another embodiment, chemicals which may increase the adhesion between the liquid suspension and the surface.

The additive may also be an additive that will facilitate removal of the wallpaper material from the surface. This might be useful when the wallpaper should be removed from the surface, e.g. when renovation of the surface is required. The removal may be a kind of controlled delamination that could be initiated by addition of a specific chemical or temperature. Examples of such additives may be waxes or thermoplastics which melt when the temperature increases which makes it possible to easily remove the wallpaper by applying heat to the wallpaper.

It may also be possible to include microparticle lignin to the suspension to provide the surface with a microporous structure which will make it possible to produce a "breathable" surface. In this way a wall or a ceiling may be provided with a wallpaper material where non-liquids may transit through.

Another possible additive to be added to the suspension is phase change materials, e.g. phase change wax, which will have a heat buffering function making it possible to regulate the temperature on the surface to which the wallpaper material has been applied.

Also, a small amount of alcohol or other fast drying additives may dramatically increase the drying speed by evaporation of the water in the suspension, which may be beneficial for the drying speed of the suspension when it has been applied onto the wall.

According to yet an alternative embodiment, the additive may be fire retardant agents such as existing intumescent agents. The MFC could act as an anchor for the fire agent on the surface and also act as an effective stabilizer in the suspension when mixing more complex components, such as fire retardants, in the suspension ensuring good flow rate from the nozzles to the surface.

According to another embodiment the liquid suspension 2 also includes other additives, e.g. colorants that would give the wall paper a specific color, etc. Another example of an additive is latex which improves the flexibility of the wall paper, and thus impacts and improves the wallpapers possibility to move. This could be advantageous if there is for instance some movements of the wall after the wallpaper has been applied to the wall.

According to one embodiment powdered lignin may be introduced into the formulation or liquid suspension as a binding and cross linking agent. A viscose resin might further be added to the MFC and lignin mixture to form a suspension especially suitable for spraying the liquid suspension to create a laminated paper like material. According to one alternative of this embodiment heat may be applied to melt or cure the mixture. The heat may be applied by blowing hot air onto the surface after applying the liquid suspension.

According to one embodiment an additive may be an antimicrobial additive to create antimicrobial, antibacterial and/or anti-mould properties to the surface. By providing the surface with antimicrobial, antibacterial and/or anti-mould properties, means that growth of antimicrobial organisms on the surface is prevented or reduced.

According to one embodiment the liquid suspension may be applied onto a surface simply by spraying it onto the wall. There are different techniques and equipment for spraying a liquid suspension available today. Furthermore the spray nozzle of such equipment may be designed to specifically apply this type of liquid suspension.

The application of the suspension onto the wall creates or forms a layer or film onto the wall of the liquid suspension. When the suspension dries or is dried the film forms a dry fiber web on the wall, i.e. at least one layer of the wall paper.

According to an alternative embodiment, the suspension may be coated, or even painted onto the surface.

The formation of the film is promoted by hydro-colloidal effects due to the presence of cellulosic fibers, in which the fibers of the suspension stick together.

According to one embodiment the thickness of the wallpaper, i.e. the layer applied onto the surface, may be varied depending on the desired appearance of the wallpaper, the fibers used, filler used etc. The thickness of a layer may for example be between 5-100 gsm. It is also possible to create different contours, such as 3D effect by using different spraying techniques.

By being able to create wallpaper with a 3D effect it may be possible to easily create a surface structure which for instance prevents echoing or provides optimal acoustic characteristics in a room or space.

According to an alternative embodiment more than one layer can be applied. According to this embodiment the first layer may have dried or may be substantially dry before adding a second layer. The first layer may also still be wet or substantially wet before adding the second layer.

According to an alternative embodiment it may be possible to use robotic equipment for the application, e.g. spraying, of the suspension onto the wall. By using robots with multiple spraying nozzles it is possible to load the robot with different suspensions with different properties, e.g. different colors, and then to create a wallpaper having different patterns or colors, i.e. it is possible to spray a multicolored wallpaper, or wallpaper having different patterns. A further possibility is to spray suspensions having different fibrous contents thereby also being able to create different effects and patters on the wall.

According to one embodiment, when a robot is used, a designer may pre-determine the surface appearance by using CAD/CAM applications via computer aided design which is then converted to computer aided manufacturing of the surface using our new invented formulation.

After the application of the liquid suspension onto the surface the suspension must be dried at a phase allowing for the suspension or mixture to stick to the wall or surface. According to one alternative the suspension may be air dried, i.e. allowed to dry on its own. According to another embodiment the applied suspension layer or layers are actively dried, e.g. by using heat (convection) or hot air. The manner of drying suspension depends for instance on the surrounding temperature or moisture contents.

According to one embodiment this inventive wall paper may be used as a way to prevent graffiti to stick to a wall. Since the wall paper could be sprayed onto a surface in a very thin layer it could also easily be removed and eventual graffiti could thus be easily removed together with the wallpaper. Thus, the present invention provides an improved method that demands less work and less hazardous chemicals for the sanitation of graffiti. Therefore, the wallpaper may be applied to outdoor surfaces such as houses, viaducts, etc., i.e. surfaces that are attractive to graffiti writers.

According to one embodiment the suspension comprising the cellulosic fibers and any additives thereto may be sold in ready-made ampoules which can easily be inserted into the spraying device. The ampoules may be provided with a specific pigment or color, e.g. at the retailer or ordered directly from the manufacturer.

According to one embodiment, the invention may be implemented to paint newly made cement surfaces, in order to prevent that these from drying out too fast, i.e. prevention of cracks formed due to too fast drying. This surface will also protect cement surface from dirt ext. during construction work or similar.

The cellulosic fibers may be any kind of cellulosic fibers, e.g. softwood fibers, hardwood fibers, annular crop fibers etc. The fibers may also be fibers from chemical pulp, chemi-thermo mechanical pulp (CTMP) or mechanical pulp.

Example

Samples comprising pigments of different colors and MFC were formed in order to test the mixing properties, adhesive properties, drying time and the color response of the each sample. The pigments were manufactured by Uula.

Four different samples one with green, one with yellow, one with red and one with green pigments were mixed.

The samples comprised MFC and pigment in the in the following ratios (volumetric): MFC:H2O=2:3 which means that 2 kg of MFC with a consistency of 25% were mixed with 3 kg water and thereafter were pigments in the following ratio (volumetric) added: Pigment: MFC/H2O=1:50=2-3%.

The samples were thereafter sprayed onto three different surfaces; plasterboard, wood panel and plywood surfaces.

All samples showed a very good adhesion and strong coloring. The drying time was approximately a few hours and it took longer for the samples to dry on the plywood surface.

Thus, the results showed that it is possible to apply a layer comprising MFC and pigment by spraying a suspension onto the surface in order to produce a colored wall paper on the surface.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for applying a wallpaper material onto a surface comprising the steps of:
providing a liquid suspension comprising at least 40% by weight microfibrillated cellulose and wherein said liquid suspension has a dry content of at least 10% by weight;
applying at least one layer of said liquid suspension onto the surface; and
drying said liquid suspension layer after it has been applied onto the surface, and thereby forming a dry fiber web layer, wherein said fiber web layer forms said wallpaper material.

2. The method as claimed in claim 1, wherein said suspension further comprises any one of a pigment, a filler and an additive, or a combination thereof.

3. The method as claimed in claim 1, wherein said liquid suspension has a dry content of at least 20% by weight.

4. The method as claimed in claim 1, wherein the step of applying said liquid suspension onto said surface is performed by means of spraying.

5. The method as claimed in claim 1, wherein the method further comprises the step of applying two or more layers of the liquid suspension onto the surface.

6. The method as claimed in claim 1, wherein said layer has a predetermined thickness.

7. The method of claim 1, wherein the liquid suspension comprises at least 50% by weight of microfibrillated cellulose.

* * * * *